US012722519B2

(12) United States Patent
Kimura et al.

(10) Patent No.: US 12,722,519 B2
(45) Date of Patent: Sep. 1, 2026

(54) ELECTRIC POWER CONTROL SYSTEM AND ELECTRIC POWER CONTROL METHOD

(71) Applicant: HONDA MOTOR CO., LTD., Tokyo (JP)

(72) Inventors: Toru Kimura, Offenbach/Am Main (DE); Martin Kopp, Offenbach/Am Main (DE); Christian Koebel, Offenbach/Am Main (DE); Hisashi Nagaoka, Offenbach/Am Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 809 days.

(21) Appl. No.: 17/974,617

(22) Filed: Oct. 27, 2022

(65) Prior Publication Data

US 2023/0150388 A1 May 18, 2023

(30) Foreign Application Priority Data

Nov. 17, 2021 (JP) ................................ 2021-187101

(51) Int. Cl.

*B60L 53/63* (2019.01)
*B60L 53/65* (2019.01)
(Continued)

(52) U.S. Cl.

CPC ............... *B60L 53/63* (2019.02); *B60L 53/65* (2019.02); *B60L 53/665* (2019.02); *B60W 50/12* (2013.01)

(58) Field of Classification Search

None
See application file for complete search history.

(56) References Cited

U.S. PATENT DOCUMENTS

2009/0143929 A1* 6/2009 Eberhard .............. B60L 3/0046 903/907
2021/0053458 A1 2/2021 Fujiwara et al.
(Continued)

FOREIGN PATENT DOCUMENTS

CN 110599261 A 12/2019
CN 111106620 A 5/2020
(Continued)

OTHER PUBLICATIONS

Japanese Office Action dated Apr. 4, 2023 issued in corresponding Japanese application No. 2021-187101; English machine translation included (7 pages).
(Continued)

*Primary Examiner* — David V Henze
(74) *Attorney, Agent, or Firm* — Rankin, Hill & Clark LLP

(57) ABSTRACT

A electric power control system for controlling charge-discharge operation of a battery mounted on a vehicle includes: a plurality of computers, each operating so as to hold a distributed ledger identical to each other; a generation unit for generating transaction data including information related to charge-discharge operation of the battery; a ledger management unit for receiving the transaction data, and for recording the received transaction data in the distributed ledger; and a control unit for controlling charge-discharge operation of the battery, wherein: information related to the charge-discharge operation includes intention information that is information on an intention of a user of the vehicle regarding the charge-discharge operation; and the control unit executes the charge-discharge operation under an operating condition reflecting an intention of the user based on the intention information included in the transaction data recorded in the distributed ledger.

7 Claims, 10 Drawing Sheets

(51) Int. Cl.
*B60L 53/66* (2019.01)
*B60W 50/12* (2012.01)

(56) References Cited

U.S. PATENT DOCUMENTS

| | | | | |
|---|---|---|---|---|
| 2021/0170903 | A1* | 6/2021 | Tsuchiya | B60L 58/16 |
| 2021/0221247 | A1* | 7/2021 | Daniel | B60L 55/00 |
| 2022/0277366 | A1* | 9/2022 | Shih | H02J 7/007188 |

FOREIGN PATENT DOCUMENTS

| | | | |
|---|---|---|---|
| DE | 10 2021 109 015.6 | A1 | 10/2021 |
| EP | 3 761 255 | A1 | 1/2021 |
| JP | 6485566 | B1 | 3/2019 |
| JP | 2019-113957 | A | 7/2019 |
| JP | 2019-146436 | A | 8/2019 |
| JP | 2019-177809 | | 10/2019 |
| JP | 2021-93802 | A | 6/2021 |
| JP | 2021-107951 | A | 7/2021 |

OTHER PUBLICATIONS

German Office Action dated Jul. 9, 2024 issued in corresponding German application No. 10 2022 129 103.0; English translation included (11 pages).

Chinese Office Action dated Apr. 30, 2026 issued in corresponding Chinese application No. 202211421421.2; English machine translation included (16 pages).

* cited by examiner

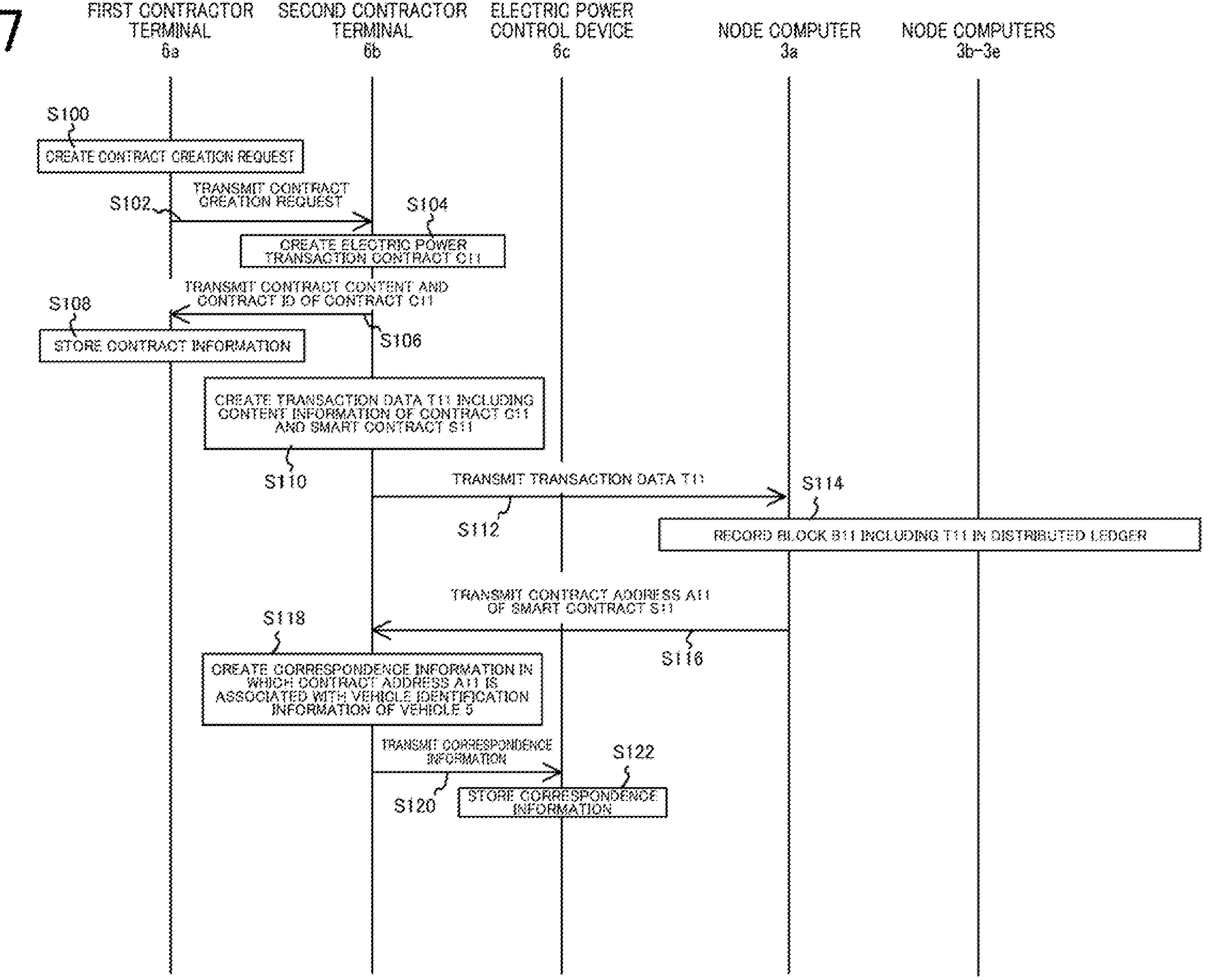
FIG. 7
FIRST CONTRACTOR TERMINAL 6a
SECOND CONTRACTOR TERMINAL 6b
ELECTRIC POWER CONTROL DEVICE 6c
NODE COMPUTER 3a
NODE COMPUTERS 3b-3e
S100
CREATE CONTRACT CREATION REQUEST
S102
TRANSMIT CONTRACT CREATION REQUEST
S104
CREATE ELECTRIC POWER TRANSACTION CONTRACT C11
S106
TRANSMIT CONTRACT CONTENT AND CONTRACT ID OF CONTRACT C11
S108
STORE CONTRACT INFORMATION
S110
CREATE TRANSACTION DATA T11 INCLUDING CONTENT INFORMATION OF CONTRACT C11 AND SMART CONTRACT S11
S112
TRANSMIT TRANSACTION DATA T11
S114
RECORD BLOCK B11 INCLUDING T11 IN DISTRIBUTED LEDGER
S116
TRANSMIT CONTRACT ADDRESS A11 OF SMART CONTRACT S11
S118
CREATE CORRESPONDENCE INFORMATION IN WHICH CONTRACT ADDRESS A11 IS ASSOCIATED WITH VEHICLE IDENTIFICATION INFORMATION OF VEHICLE 5
S120
TRANSMIT CORRESPONDENCE INFORMATION
S122
STORE CORRESPONDENCE INFORMATION

ELECTRIC POWER CONTROL SYSTEM AND ELECTRIC POWER CONTROL METHOD

INCORPORATION BY REFERENCE

The present application claims priority under 35 U.S.C. § 119 to Japanese Patent Application No. 2021-187101 filed on Nov. 17, 2021. The content of the application is incorporated herein by reference in its entirety.

BACKGROUND OF THE INVENTION

Field of the Invention

The present invention relates to an electric power control system and an electric power control method for controlling a charge-discharge operation of a vehicle with an external device.

Description of the Related Art

Japanese Patent Application Laid-Open No. 2019-177809 describes that, in a system that controls a vehicle, when a use authority in control information related to vehicle control is set for individual service providers, subscription information indicating a correspondence between the service provider and the use authority is managed by a blockchain in which an ECU (Electronic Control Unit) mounted on the vehicle is a node.

In recent years, consideration has been given to conducting electric power transaction between a vehicle battery and an electric power grid of an electric power company to supply electric power from the vehicle battery to the electric power grid when the electric power grid is in a state in which electric power is tight, for example, in an event of a disaster.

In this case, since the degree of deterioration of an in-vehicle battery varies depending on operating conditions during discharge operation, the operating conditions for charge-discharge operation of the in-vehicle battery may be determined in an electric power transaction contract or the like.

However, even if an operating conditions are determined in the contract or the like, application of the operating condition in the actual charge-discharge operation involves difficulty in which, for example, the vehicle user needs to set the operating condition for the charge-discharge device provided in the electric power grid each time he/she starts charge-discharge operation between the in-vehicle battery and the electric power grid.

From the above background, an object of the present invention is to perform a battery charge-discharge operation under an operating condition accurately reflecting an intention of a user while simplifying operation of a user, for example, in an electric power transaction using a battery.

The above object relates to a contract execution using a blockchain, which is becoming a social infrastructure. Simplifying operation of users can realize fair accessibility that can be used even by users with low IT literacy, and can contribute to realizing a sustainable society (SDGs 8.10, 9.1, 10.2).

SUMMARY OF THE INVENTION

An aspect of the present invention is an electric power control system for controlling charge-discharge operation of a battery mounted on a vehicle, the electric power control system including: a plurality of computers, each operating so as to hold a distributed ledger identical to each other; a generation unit for generating transaction data including information related to charge-discharge operation of the battery; a ledger management unit for receiving the transaction data and for recording the received transaction data in the distributed ledger; and a control unit for controlling charge-discharge operation of the battery, wherein the information related to the charge-discharge operation includes intention information, the intention information being information on an intention of a user of the vehicle regarding the charge-discharge operation, and the control unit executes the charge-discharge operation under an operating condition, the operating condition reflecting an intention of the user based on the intention information included in the transaction data recorded in the distributed ledger.

According to another aspect of the present invention, the intention information includes an intention of the user, the intention being to prioritize prevention of deterioration of the battery or being to maintain a remaining charge amount of the battery.

According to yet another aspect of the present invention, when an intention of the user indicated by the intention information is to prioritize prevention of deterioration of the battery, the control unit controls the charge-discharge operation so that a remaining charge amount of the battery is maintained within a predetermined range.

According to yet another aspect of the present invention, when an intention of the user indicated by the intention information is to maintain a remaining charge amount of the battery, the control unit controls the charge-discharge operation so that a remaining charge amount of the battery is maintained in a range higher than a remaining charge amount at a start of the charge-discharge operation.

According to yet another aspect of the present invention, the control unit is provided in an electric power control device outside the vehicle, the electric power control device being connected to a battery of the vehicle in the charge-discharge operation.

According to yet another aspect of the present invention, the control unit acquires the intention information on the vehicle based on correspondence information in which vehicle identification information for identifying the vehicle is associated with access information for accessing the intention information included in the transaction data created for the vehicle.

According to yet another aspect of the present invention, the transaction data includes a smart contract including a program for transmitting the intention information, and the access information is a contract address of the smart contract.

Yet another aspect of the present invention is an electric power control method executed by an electric power control system including a vehicle and a plurality of computers, the vehicle being equipped with a battery, the plurality of computers each operating so as to hold a distributed ledger identical to each other, the electric power control method including: a step of generating, by a generation unit, transaction data including information related to charge-discharge operation of the battery; a step of receiving the transaction data and recording the received transaction data in the distributed ledger, by a ledger management unit; and a step of controlling, by a control unit, charge-discharge operation of the battery, wherein the information related to the charge-discharge operation includes intention information, the intention information being information on an intention of a user of the vehicle regarding the charge-discharge operation, and the control unit, in the step of controlling, executes the charge-discharge operation under an operating condition, the operating condition reflecting an intention of the user based on the intention information included in the transaction data recorded in the distributed ledger.

The aspects of the present invention make it possible to perform a battery charge-discharge operation under an operating condition accurately reflecting the intention of the user while simplifying the operation of the user, for example, in an electric power transaction using a battery.

BRIEF DESCRIPTION OF THE DRAWINGS

FIG. 7 is a sequence diagram showing an example of operation of the electric power control system;

DETAILED DESCRIPTION OF THE PREFERRED EMBODIMENTS

The following describes embodiments of the present invention with reference to drawings.

1. Configuration And Use Aspect of Electric Power Control System

Figure 1:
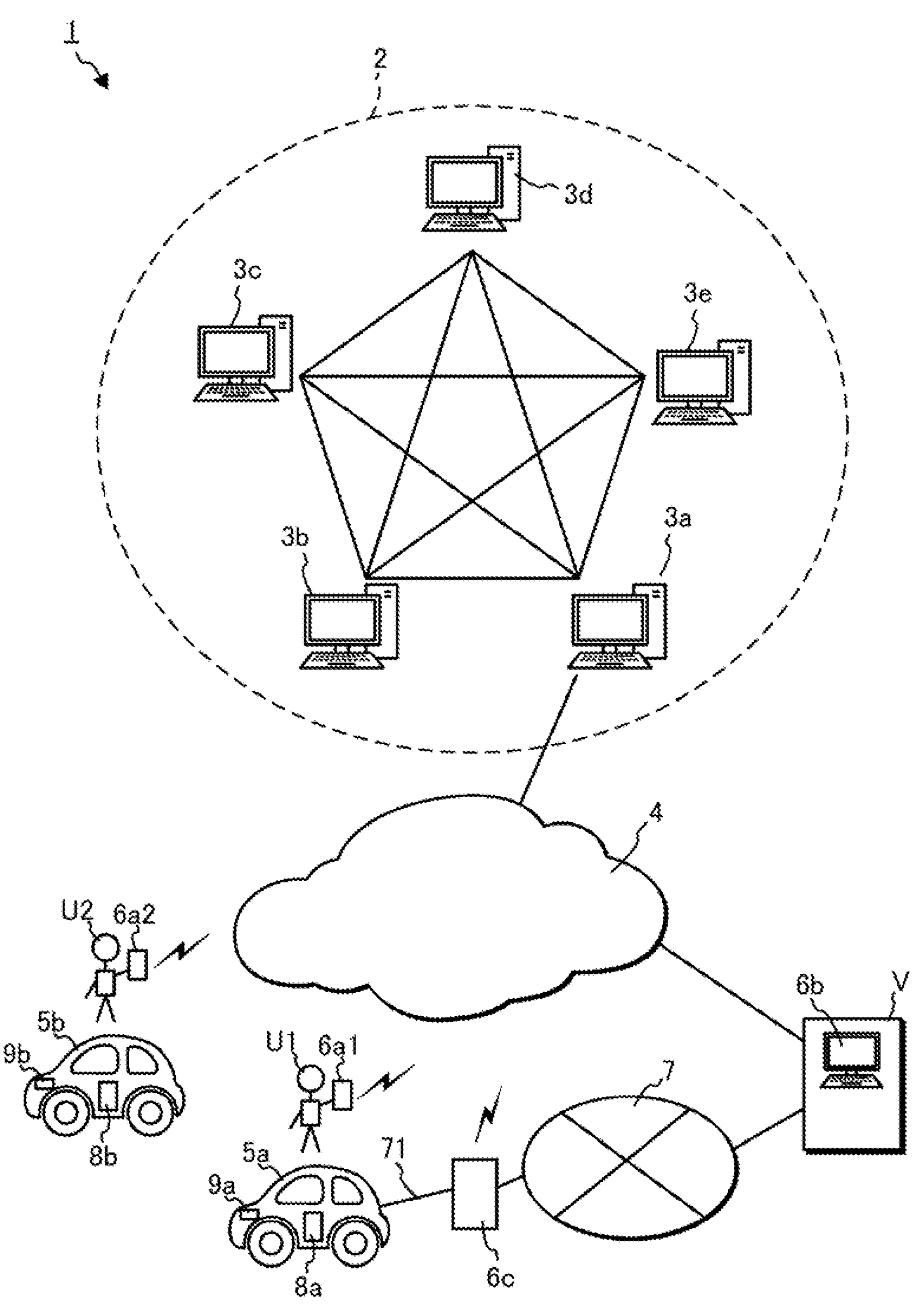
FIG. 1 is a diagram showing a configuration of an electric power control system according to an embodiment of the present invention.

FIG. 1 is a diagram showing a configuration of an electric power control system according to an embodiment of the present invention. As an example, an electric power control system 1 shown in FIG. 1 controls charge-discharge operation of the batteries 8*a* and 8*b* of vehicles 5*a* and 5*b* with an electric power grid 7 of the electric power company V, based on an electric power transaction contract between users U1 and U2 of the electric vehicles 5*a* and 5*b* and the electric power company V. The vehicles 5*a* and 5*b* respectively include batteries 8*a* and 8*b*, as well as operation monitoring devices 9*a* and 9*b* for monitoring the charge-discharge operation of these batteries.

The electric power control system 1 has five node computers 3*a*, 3*b*, 3*c*, 3*d*, and 3*e*, which are computers constituting nodes of a blockchain network 2. Hereinafter, the node computers 3*a*, 3*b*, 3*c*, 3*d*, and 3*e* may be collectively referred to as node computers 3. The number of the node computers 3 included in the electric power control system 1 is not limited to five, and may be any number of two or more. The node computers 3 are communicably connected to each other, and operate so that each holds a distributed ledger identical to each other. The node computers 3 thereby constitute, for example, a private or public blockchain network 2 using Ethereum as a platform.

The electric power control system 1 also includes a plurality of terminal devices that are communicably connected to at least one of the node computers 3, for example, the node computer 3*a*, via a communication network 4. In the example shown in FIG. 1, the electric power control system 1 has first contractor terminals 6*a*1 and 6*a*2, a second contractor terminal 6*b*, and an electric power control device 6*c*, as terminal devices. The batteries 8*a* and 8*b* of the vehicles 5*a* and 5*b* are each connected to the electric power grid 7 via the electric power control device 6*c* with a cable 71. Thereby, the vehicles 5*a* and 5*b* perform charge-discharge operation of the battery 8 with the electric power grid 7 under control of the electric power control device 6*c*.

The first contractor terminals 6*a*1 and 6*a*2 are respectively terminal devices operated by the users U1 and U2, of the vehicles 5*a* and 5*b*, which are one side of contractors of the above-mentioned electric power transaction contract.

The second contractor terminal 6*b* is the second contractor terminal 6*b* operated by the electric power company V, which is the other side of the contractor.

Further, the electric power control device 6*c* is a device provided in the electric power grid 7 as an interface with the vehicles 5*a* and 5*b* equipped with the batteries 8*a* and 8*b* used for electric power transaction. The electric power control device 6*c*, as a terminal device, communicates with the blockchain network 2 via the communication network 4. The electric power control device 6*c* also controls the charge-discharge operation of the batteries 8*a* and 8*b* with the electric power grid 7 based on information obtained from the blockchain network 2.

Hereinafter, the users U1 and U2 may be collectively referred to as users U, and the first contractor terminals 6*a*1 and 6*a*2 may be collectively referred to as first contractor terminals 6*a*. Further, the first contractor terminals 6*a*1 and 6*a*2, the second contractor terminal 6*b*, and the electric power control device 6*c* may be collectively referred to as terminal devices 6. Further, the vehicles 5*a* and 5*b* may be collectively referred to as vehicles 5, and the batteries 8*a* and 8*b* are collectively referred to as batteries 8. Further, the operation monitoring devices 9*a* and 9*b* may be collectively referred to as operation monitoring devices 9.

The electric power transaction contract between a user U and an electric power company V has contract conditions including both the electricity purchase unit price when the user U charges the battery 8 of the vehicle 5 from the electric power grid 7, and electricity sales unit price when the user U discharges the battery 8 of vehicle 5 to electric power grid 7. Further, the user U can indicate to the electric power company V an intention of the user U regarding the charge-discharge operation of the battery 8 of the vehicle 5 with respect to the electric power grid 7. The electric power company V adds the above intention in the electric power transaction contract, and performs charge-discharge operation between the electric power grid 7 and the battery 8 of the vehicle 5 with the electric power control device 6*c* under the operating condition in line with the intention.

In the present embodiment, the electric power company V records intention information, which is information on the intention of the user U regarding the charge-discharge operation, in the distributed ledger using the electric power control system 1, to manage the intention information. Hereinafter, "recording information in the blockchain" means recording a block containing transaction data, in which the information is stored, in the distributed ledger.

The above intention information may be, for example, to prioritize prevention of deterioration of a battery 8 due to charge-discharge operation, to maintain the remaining charge amount of battery 8, or to prioritize incentives such as electricity sales fee obtained by discharging the battery 8.

Specifically, the electric power company V creates transaction data including content information of the electric power transaction contract with the user U and a smart contract using the second contractor terminal 6*b*. The content information includes the above-mentioned electricity purchase unit price and electricity sales unit price, intention information indicating the intention from the user U, and vehicle identification information for identifying the vehicle 5 of the user U. The vehicle identification information may be, for example, the vehicle body number of the vehicle 5 or the registration number thereof displayed on the license plate. The content information of the electric power transaction contract corresponds to information related to charge-discharge operation of the battery in the present disclosure.

The smart contract included in the above transaction data includes a program. For example, when any of terminal devices gives an instruction of executing the smart contract, this program may return the content information of the electric power transaction contract, included in the transaction data, to the terminal device that has given the instruction of executing it.

The node computer 3*a*, which has received the transaction data from the second contractor terminal 6*b*, records the transaction data in the blockchain, and then transmits a contract address, which is an address of the storage location of the smart contract included in the transaction data, to the second contractor terminal 6*b*, which is the transmitter of the transaction data.

The second contractor terminal 6*b* transmits the contract address of the smart contract, which has been transmitted from the node computer 3*a*, and the vehicle identification information of the vehicle 5, which is related to the corresponding electric power transaction contract, to the electric power control device 6*c*.

The electric power control device 6*c* generates and stores the correspondence information in which the received contract address is associated with the vehicle identification information. In other words, the electric power control device 6*c* holds correspondence information that associates vehicle identification information, which identifies each of the vehicles 5, with access information for accessing the intention information included in the transaction data created for the electric power transaction contract related to the vehicle 5. In the present embodiment, the access information is the contract address of the smart contract, which includes the program for returning the content information of the above electric power transaction contract included in the above transaction data.

When any of the vehicles 5 is connected by the cable 71, the electric power control device 6*c* acquires vehicle identification information from the vehicle 5. The electric power control device 6*c* refers to the correspondence information based on the acquired vehicle identification information, and executes the smart contract of the contract address associated with the acquired vehicle identification information. Thereby, the electric power control device 6*c* acquires intention information on the vehicle 5 from the distributed ledger. Then, the electric power control device 6*c* executes charge-discharge operation of the battery 8 of the vehicle 5 under the operating condition according to the acquired intention information.

Figure 2:
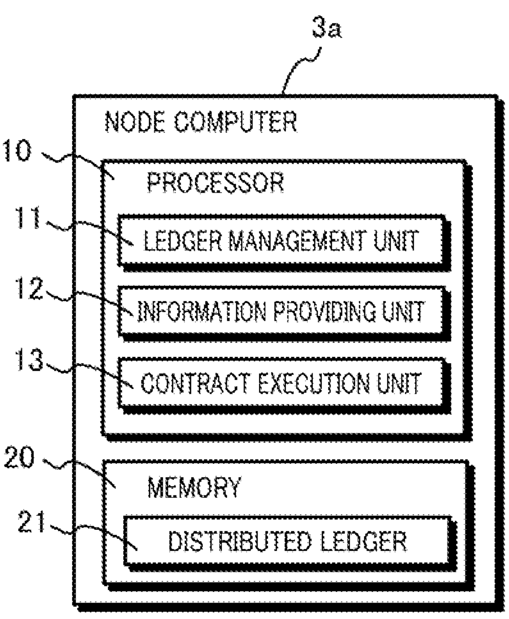
FIG. 2 is a diagram showing an example of a configuration of a node computer.

FIG. 2 is a diagram showing an example of a configuration of the node computer 3*a*. The node computer 3*a* includes a processor 10 and a memory 20. The memory 20 is formed from, for example, a volatile and/or non-volatile semiconductor memory, and/or a hard disk device or the like. The processor 10 is formed from, for example, one or a plurality of CPUs (Central Processing Units) or MPUs (Micro Processing Units).

The processor 10 includes a ledger management unit 11, an information providing unit 12, and a contract execution unit 13 as functional elements or functional units. These functional elements included in the processor 10 are realized, for example, by the processor 10 executing a computer program stored in the memory 20.

The ledger management unit 11 receives the transaction data and records the block including the received transaction data in the distributed ledger 21 stored in the memory 20. Specifically, the ledger management unit 11 receives transaction data from another node computer 3 or terminal device 6, and generates a block including the received transaction data. Then, the ledger management unit 11 records the generated block in the distributed ledger 21 stored in the memory 20, and transmits the generated block to the other node computers 3. As a result, in the other node computers 3, the generated block is recorded in the distributed ledgers held by the respective node computers 3.

In the present embodiment, the ledger management unit 11 receives the transaction data including the above-mentioned intention information, the vehicle identification information, and the smart contract from the second contractor terminal 6*b* of the electric power company V. Then, the ledger management unit 11 generates a block of the received transaction data and stores it in the distributed ledger 21.

Note that the ledger management unit 11 generates the above blocks and records the generated blocks in the distributed ledger 21 under rules of a blockchain platform such as Ethereum according to the prior art. Such rules may include verification processing of a creator's electronic signature contained in transaction data, mining processing that may be performed in generating a block, and execution of a consensus algorithm.

When the ledger management unit 11 records a block, which contains transaction data including a smart contract, in the distributed ledger 21, the information providing unit 12 transmits the contract address, which is the storage location of the smart contract, to the transmitter of the transaction data. Alternatively, when the information providing unit 12 receives an inquiry for a contract address specifying a smart contract from a terminal device 6 according to the prior art, the information providing unit 12 transmits the contract address of the specified smart contract to the terminal device 6.

In the present embodiment, the ledger management unit 11 records the block of transaction data, which is received from the second contractor terminal 6*b* of the electric power company V, in the distributed ledger 21. At that time, the information providing unit 12 transmits the contract address, which indicates the storage location of the smart contract included in the transaction data, to the second contractor terminal 6*b*, which is the transmitter.

In response to the receiving transaction data for the contract address, which is the storage location of the smart contract, the contract execution unit 13 executes the program contained in the smart contract stored in the contract address. At that time, the contract execution unit 13 can execute the smart contract, for example, by using the execution condition included in the received transaction data.

In the present embodiment, the transaction data of the contract execution is transmitted from the electric power control device 6*c* to the contract address of the smart contract of the electric power transaction contract, and thereby the smart contract is executed. This causes the content information of the electric power transaction contract to be transmitted from the node computer 3*a* to the electric power control device 6*c*. Further, in response to the contract execution unit 13 executing the smart contract, the ledger management unit 11 records a block, which includes the transaction data of the contract execution, in the distributed ledger 21 according to the prior art.

Figure 3:
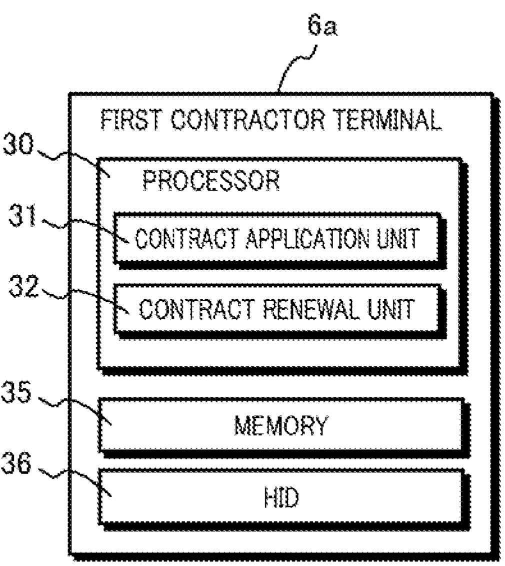
FIG. 3 is a diagram showing an example of a configuration of a first contractor terminal.

The next describes a configuration of the first contractor terminal 6*a* held by the user U of the vehicle 5. FIG. 3 is a diagram showing an example of the configuration of the first contractor terminal 6*a*.

The first contractor terminal 6*a* includes a processor 30, a memory 35, and a HID 36. The HID 36 is, for example, a touch panel. The memory 35 is formed from, for example, a volatile and/or non-volatile semiconductor memory. The processor 30 is, for example, a CPU.

The processor 30 includes a contract application unit 31 and a contract renewal unit 32 as functional elements or functional units. These functional elements included in the processor 30 are realized, for example, by the processor 30 executing a computer program stored in the memory 35.

The contract application unit 31 transmits a contract creation request for applying for the conclusion of the electric power transaction contract to the second contractor terminal 6*b* of the electric power company V in response to the contract application instruction from the user U via the HID 46. The contract application instructions include the vehicle identification information of the vehicle 5 used by the user U and the above-mentioned intention information of the user U. The contract application unit 31 transmits a contract creation request including the vehicle identification information and the intention information to the second contractor terminal 6*b*.

As is to be described below, the second contractor terminal 6*b* creates an electric power transaction contract for the user U in response to receiving the above contract creation request, and transmits the content and the contract ID of the created electric power transaction contract to the first contractor terminal 6*a*. When the contract application unit 31 receives the content and the contract ID of the electric power transaction contract, the contract application unit 31 stores these as contract information in the memory 35.

The contract renewal unit 32 transmits a renewal request requesting a change in the intention information in the electric power transaction contract to the second contractor terminal 6*b* of the electric power company V in response to the contract renewal instruction from the user U via the HID 36. The contract renewal instruction includes the vehicle identification information of the vehicle 5 and the new intention information indicating the new intention of the user U. The contract renewal unit 32 refers to the contract information stored in the memory 35 and acquires the contract ID of the electric power transaction contract including the vehicle identification information included in the contract renewal instruction. The contract renewal unit 32 transmits a renewal request including the acquired contract ID and the new intention information to the second contractor terminal 6*b*.

Figure 4:
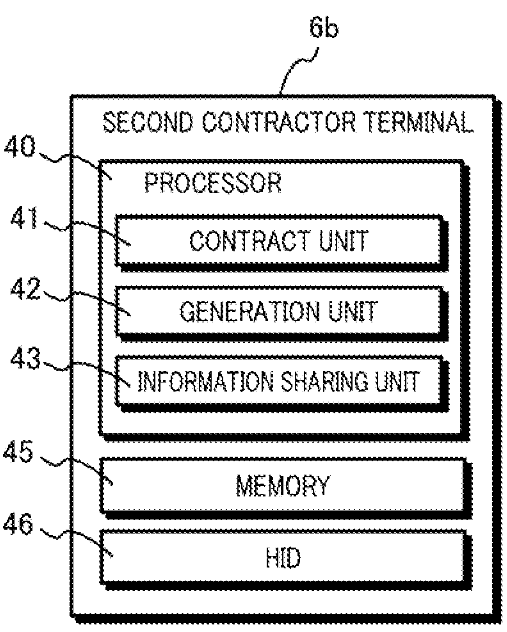
FIG. 4 is a diagram showing an example of a configuration of a second contractor terminal.

The next describes a configuration of the second contractor terminal 6*b*. FIG. 4 is a diagram showing an example of the configuration of the second contractor terminal 6*b* operated by the electric power company V, which is the other contractor of the electric power transaction contract. The second contractor terminal 6*b* includes a processor 40, a memory 45, and a HID 46. The HID 46 is, for example, a touch panel. The memory 45 is formed from, for example, a volatile and/or non-volatile semiconductor memory. The processor 40 is, for example, a CPU.

The processor 40 includes a contract unit 41, a generation unit 42, and an information sharing unit 43 as functional elements or functional units. These functional elements included in the processor 40 are realized, for example, by the processor 40 executing a computer program stored in the memory 45.

The contract unit 41 creates an electric power transaction contract and generates a unique contract ID for identifying the created electric power transaction contract in response to receiving the contract creation request from the first contractor terminal 6*a*. The electric power transaction contract may include the above-mentioned electricity purchase unit price and electricity sales unit price in addition to the vehicle identification information and intention information included in the received contract creation request. The contract unit 41 transmits the contract content information including the content of the created electric power transaction contract and the identification ID to the first contractor terminal 6*a*.

Further, the contract unit 41 renews the content of the corresponding electric power transaction contract in response to receiving the renewal request from the first contractor terminal 6*a*. The contract unit 41 identifies the electric power transaction contract to be renewed from the contract ID included in the received renewal request. Then, the contract unit 41 renews the content of the identified electric power transaction contract using the new intention information included in the renewal request. The contract unit 41 transmits the contents and the contract ID of the renewed electric power transaction contract to the first contractor terminal 6*a*.

When the contract unit 41 creates or renews the electric power transaction contract, the generation unit 42 creates transaction data including the content information of the electric power transaction contract created or renewed and the smart contract. As described above, the content information may include intention information indicating the intention from the user U, vehicle identification information for identifying the vehicle 5 of the user U, and electricity purchase unit price and electricity sales unit price. The transaction data including the content information of the electric power transaction contract corresponds to transaction data including information related to charge-discharge operation of the battery in the present disclosure.

As described above, the smart contract may return the content information of the electric power transaction contract, which is included in the transaction data including the smart contract, to the terminal device having given an instruction of executing the smart contract. The transaction data may include an electronic signature indicating the second contractor terminal 6*b* that has generated the transaction data according to the prior art.

The generation unit 42 transmits the generated transaction data to the node computer 3*a*. After that, the generation unit 42 receives the contract address of the smart contract included in the transmitted transaction data from the node computer 3*a*. Then, the generation unit 42 stores the received contract address together with the corresponding electric power transaction contract.

When the generation unit 42 receives the contract address from the node computer 3*a*, the information sharing unit 43 transmits the correspondence information in which the received contract address is associated with the vehicle identification information, which is included in the content of the corresponding electric power transaction contract, to the electric power control device 6*c*. As mentioned above, this correspondence information corresponds to correspondence information in the present disclosure in which the vehicle identification information is associated with the access information for accessing the intention information included in the transaction data created for the vehicle. Further, in the present embodiment, the access information is a contract address received from the node computer 3*a* by the generation unit 42. In other words, the access information is the contract address in the blockchain of the smart contract included in the transaction data generated by the generation unit 42.

Figure 5:
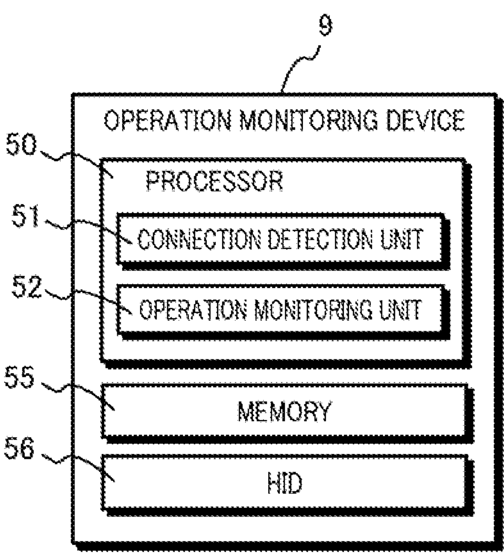
FIG. 5 is a diagram showing an example of a configuration of an operation monitoring device.

The next describes a configuration of the operation monitoring device 9 included in the vehicle 5. FIG. 5 is a diagram showing an example of the configuration of the operation monitoring device 9.

The operation monitoring device 9 includes a processor 50, a memory 55, and a HID 56. The HID 56 is, for example, a touch panel. The memory 55 is formed from, for example, a volatile and/or non-volatile semiconductor memory. The processor 50 is, for example, a CPU.

The processor 50 includes a connection detection unit 51 and an operation monitoring unit 52 as functional elements or functional units. These functional elements included in the processor 50 are realized, for example, by the processor 50 executing a computer program stored in the memory 55.

The connection detection unit 51 detects that the vehicle 5 is connected to the electric power control device 6*c* by the cable 71, and transmits the vehicle identification information of the vehicle 5 to the electric power control device 6*c*.

The operation monitoring unit 52 calculates the charge-discharge amount and the remaining charge amount of the battery 8 when the battery 8 is charged or discharged. The operation monitoring unit 52 displays information on the calculated charge-discharge amount and remaining charge amount on a display (not shown) mounted on the vehicle 5, or transmits the information to the first contractor terminal 6*a*.

Figure 6:
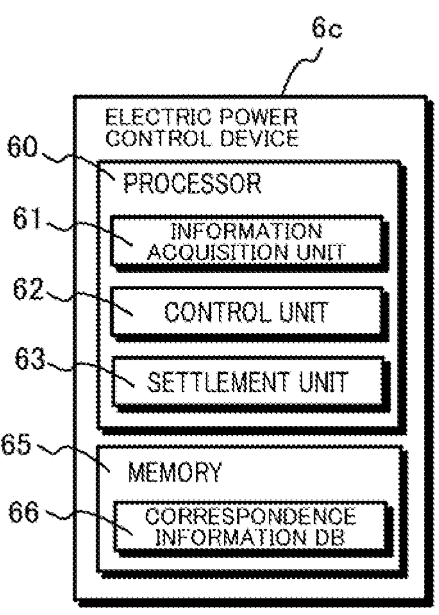
FIG. 6 is a diagram showing an example of a configuration of an electric power control device.

The next describes a configuration of the electric power control device 6*c*. FIG. 6 is a diagram showing an example of the configuration of the electric power control device 6*c*.

The electric power control device 6*c* includes a processor 60 and a memory 65. The memory 65 is formed from, for example, a volatile and/or non-volatile semiconductor memory, and/or a hard disk device or the like. The processor 60 is, for example, a CPU.

The processor 60 includes an information acquisition unit 61, a control unit 62, and a settlement unit 63 as functional elements or functional units. These functional elements included in the processor 60 are realized, for example, by the processor 60 executing a computer program stored in the memory 65.

The information acquisition unit 61 receives the correspondence information, in which the vehicle identification information is associated with the contract address, from the second contractor terminal 6*b*, and stores the correspondence information in the correspondence information DB 66 stored in the memory 65.

The control unit 62 controls charge-discharge operation of the battery 8 of the vehicle 5 in the electric power transaction based on the electric power transaction contract. At that time, the control unit 62 executes charge-discharge operation based on the intention information of the user U of the vehicle 5 under the operating conditions reflecting the intention of the user U. Here, the intention information is included in the transaction data of the electric power transaction contract for the vehicle 5 recorded in the distributed ledger 21.

Specifically, the control unit 62 acquires the vehicle identification information of the vehicle 5 from the vehicle 5 via the cable 71 when the battery 8 of the vehicle 5 and the electric power grid 7 are connected. The control unit 62 refers to the correspondence information stored in the correspondence information DB 66 of the memory 65 by the information acquisition unit 61, and identifies the correspondence information including the acquired vehicle identification information.

Based on the above-specified correspondence information, the control unit 62 acquires the contract address associated with the above-acquired vehicle identification information in the correspondence information. In addition, the control unit 62 generates transaction data giving an instruction of executing the smart contract. This transaction data may include an electronic signature indicating the electric power control device 6*c* and a communication address of the electric power control device 6*c*. The control unit 62 transmits the generated transaction data to the acquired contract address. This causes the smart contract to be executed on the node computer 3*a*. This then causes the content information of the electric power transaction contract for the vehicle 5, which is included in the transaction data including the smart contract, to be transmitted from the node computer 3*a* to the electric power control device 6*c*.

The control unit 62 receives the transmitted content information and extracts the intention information from the content information. Then, the control unit 62 executes the charge-discharge operation of the battery 8 of the vehicle 5 under the operating condition reflecting the intention of the user U based on the acquired intention information.

For example, when the intention of the user U indicated by the intention information is to prioritize the prevention of deterioration of the battery 8, the control unit 62 controls the charge-discharge operation so that the remaining charge amount of the battery 8 is maintained within a predetermined range.

Further, for example, when the intention of the user U indicated by the intention information is to maintain the remaining charge amount of the battery 8, the control unit 62 controls charge-discharge operation so that the remaining charge amount of the battery 8 is maintained in a range higher than the remaining charge amount at the start of the charge-discharge operation.

Further, for example, when the intention of the user U indicated by the intention information is to prioritize an incentive such as electricity sales fee obtained by discharging the battery 8, the control unit 62 executes discharge operation of the battery 8 until the remaining charge amount of the battery 8 reaches a predetermined lower limit value. The control unit 62 measures the charge-discharge amount of the battery 8 in the charge-discharge operation, and sends the measured charge-discharge amount to the settlement unit 63 at the end of the charge-discharge operation.

The settlement unit 63 acquires the measured charge-discharge amount from the control unit 62 at the end of the charge-discharge operation in the control unit 62. The settlement unit 63 calculates the charge fee and/or discharge fee according to the acquired charge-discharge amount. Then, the settlement unit 63 settles the calculated charge fee and/or discharge fee according to the prior art, for example, between the bank account of the electric power company V and the bank account of the user U. The calculation of the above charge may use, for example, the electricity purchase unit price and/or the electricity sales unit price included in the content information of the electric power transaction contract, which is received by the control unit 62 from the node computer 3*a*.

In the electric power control system 1 having the above configuration, when an electric power transaction contract using the battery 8 of the vehicle 5 is concluded with the electric power grid 7, intention information, which indicates an intention of the user U of the vehicle 5 regarding the charge-discharge operation of the battery 8, is recorded in the blockchain. Then, in the charge-discharge operation of the battery 8 of the vehicle 5 with the electric power grid 7, the electric power control device 6*c* acquires the intention information of the user U of the vehicle 5 from the blockchain, and executes charge-discharge operation under the operating condition in line with the intention indicated by the acquired intention information.

Therefore, the user U does not need to input the intention information to the electric power control device 6*c* in charge-discharge operation. Further, since the intention information used in the charge-discharge operation is recorded in a blockchain where it is difficult to falsify the data, the electric power control device 6*c* can correctly understand the intention of the user U.

Therefore, the electric power control system 1 can perform charge-discharge operation on the battery under the operating condition accurately reflecting the intention of the user while simplifying the operation of the user in the electric power transaction using the battery.

2. Operation Example of Electric Power Control System

FIG. 7 is a sequence diagram showing an example of the operation of the electric power control system 1.

First, the first contractor terminal 6*a* creates a contract creation request for applying for the conclusion of an electric power transaction contract with the contract application unit 31 in response to an instruction from the user U (S100). Then, the first contractor terminal 6*a* transmits the created contract creation request to the second contractor terminal 6*b* of the electric power company V (S102). The contract creation request includes vehicle identification information of the vehicle 5 used by the user U and intention information of the user U.

The second contractor terminal 6*b* creates an electric power transaction contract C11 for the user U in response to receiving the contract creation request (S104). Then, the second contractor terminal 6*b* transmits the contract content and the contract ID of the created electric power transaction contract C11 to the first contractor terminal 6*a* (S106). When the first contractor terminal 6*a* receives the content and the contract ID of the electric power transaction contract, the first contractor terminal 6*a* stores these as contract information in the memory 35 (S108).

Subsequently, the second contractor terminal 6*b* of the electric power company V creates transaction data T11 including the content information of the electric power transaction contract C11 with the user U and the smart contract S11 (S110). Then, the second contractor terminal 6*b* transmits generated transaction data T11 to the node computer 3*a* (S112). As described above, the content information includes the above-mentioned intention information indicating the intention from the user U and the vehicle identification information for identifying the vehicle 5 of the user U as a part of the electric power transaction contract. The smart contract S11 includes a program that returns the content information of the electric power transaction contract C11 to a terminal device when an execution instruction is given from the terminal device.

The ledger management unit 11 of the node computer 3*a* that has received the transaction data T11 creates a block B11 including the received transaction data T11 in accordance with the prior art in response to receiving the transaction data T11. Then, the ledger management unit 11 transmits the block B11 to the other node computers 3. Then, for example, if the consensus algorithm is executed for the block B11 in each of node computers 3 and there is no problem in the result, the block B11 is recorded in the distributed ledgers of all of the node computers 3 including the distributed ledger 21 of the node computer 3*a* (S114).

Subsequently, the information providing unit 12 of the node computer 3*a* transmits the contract address A11 of the smart contract S11 included in the transaction data T11 to the second contractor terminal 6*b* (S116). The information sharing unit 43 of the second contractor terminal 6*b* creates correspondence information in which the contract address A11, received from the node computer 3*a*, is associated with the vehicle identification information of the vehicle 5, included in the content of the corresponding electric power transaction contract (S118). Then, the information sharing unit 43 transmits the created correspondence information to the electric power control device 6*c* (S120). The information acquisition unit 61 of the electric power control device 6*c* receives the transmitted correspondence information and stores it in the correspondence information DB 66 (S122).

Figure 8:
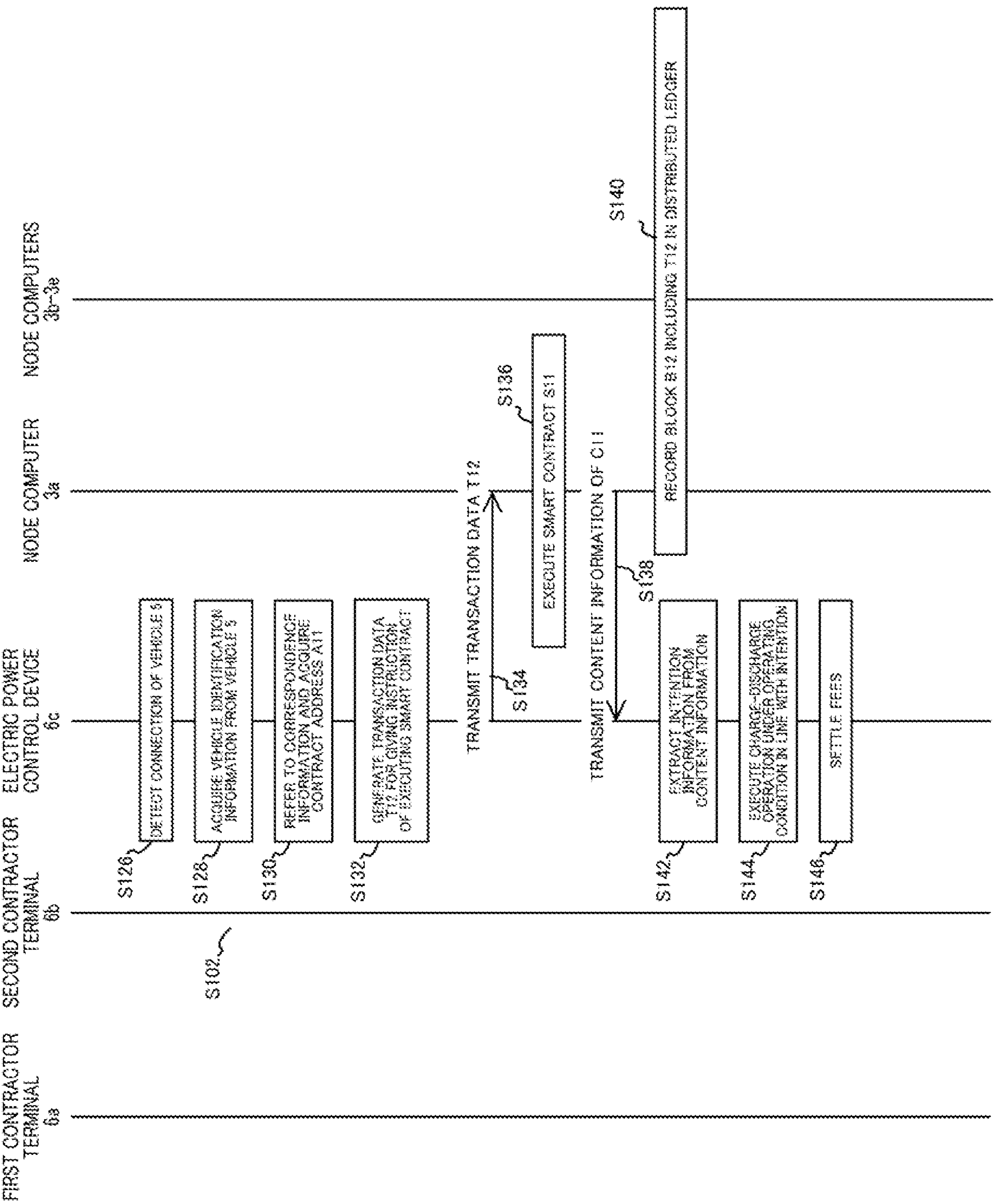
FIG. 8 is a sequence diagram showing an example of operation of the electric power control system.

With reference to FIG. 8, when the user U subsequently connects the cable 71 of the electric power control device 6*c* to the vehicle 5, the electric power control device 6*c* detects that the vehicle 5 is connected (S126). The control unit 62 of the electric power control device 6*c* acquires the vehicle identification information of the vehicle 5 from the vehicle 5 via the cable 71 (S128). Further, the control unit 62 of the electric power control device 6*c* refers to the correspondence information stored in the correspondence information DB 66 and acquires the contract address A11 corresponding to the acquired vehicle identification information (S130).

The control unit 62 of the electric power control device 6*c* generates transaction data T12 for giving an instruction of executing the smart contract (S132), and transmits the generated transaction data T12 to the contract address A11 (S134). The node computer 3*a*, which has received the transaction data T12, causes the contract execution unit 13 to execute the smart contract S11 stored in the contract address A11 that is destination where the transaction data T12 is transmitted (S136). As a result, the content information of the electric power transaction contract C11, which is included in the transaction data T11 and recorded in the distributed ledger 21 in step S114, is transmitted to the electric power control device 6*c* (S138). The ledger management unit 11 of the node computer 3*a* creates a block B12 including the received transaction data T12 and transmits it to the other node computers 3. As a result, the block B12 is recorded in the distributed ledgers of all of the node computers 3 including the distributed ledger 21 of the node computer 3*a* as in step S114 (S140).

The control unit 62 of the electric power control device 6*c* receives the transmitted content information of the electric power transaction contract, and extracts the intention information included in the electric power transaction contract (S142). Then, the control unit 62 executes charge-discharge operation of the battery 8 of the vehicle 5 with the electric power grid 7 under the operating condition according to the intention of the user U that is indicated by the extracted intention information (S144).

Then, when the charge-discharge operation is completed, the settlement unit 63 of the electric power control device 6*c* settles the fees according to the charge-discharge amount of the battery 8 according to the prior art (S146).

3. Operation Procedure in Electric Power Control System

The next describes a procedure of contract record processing with the second contractor terminal 6*b* and a procedure of charge-discharge execution processing with the electric power control device 6*c*, in the electric power control system 1.

[3.1 Contract Record Processing]

Figure 9:
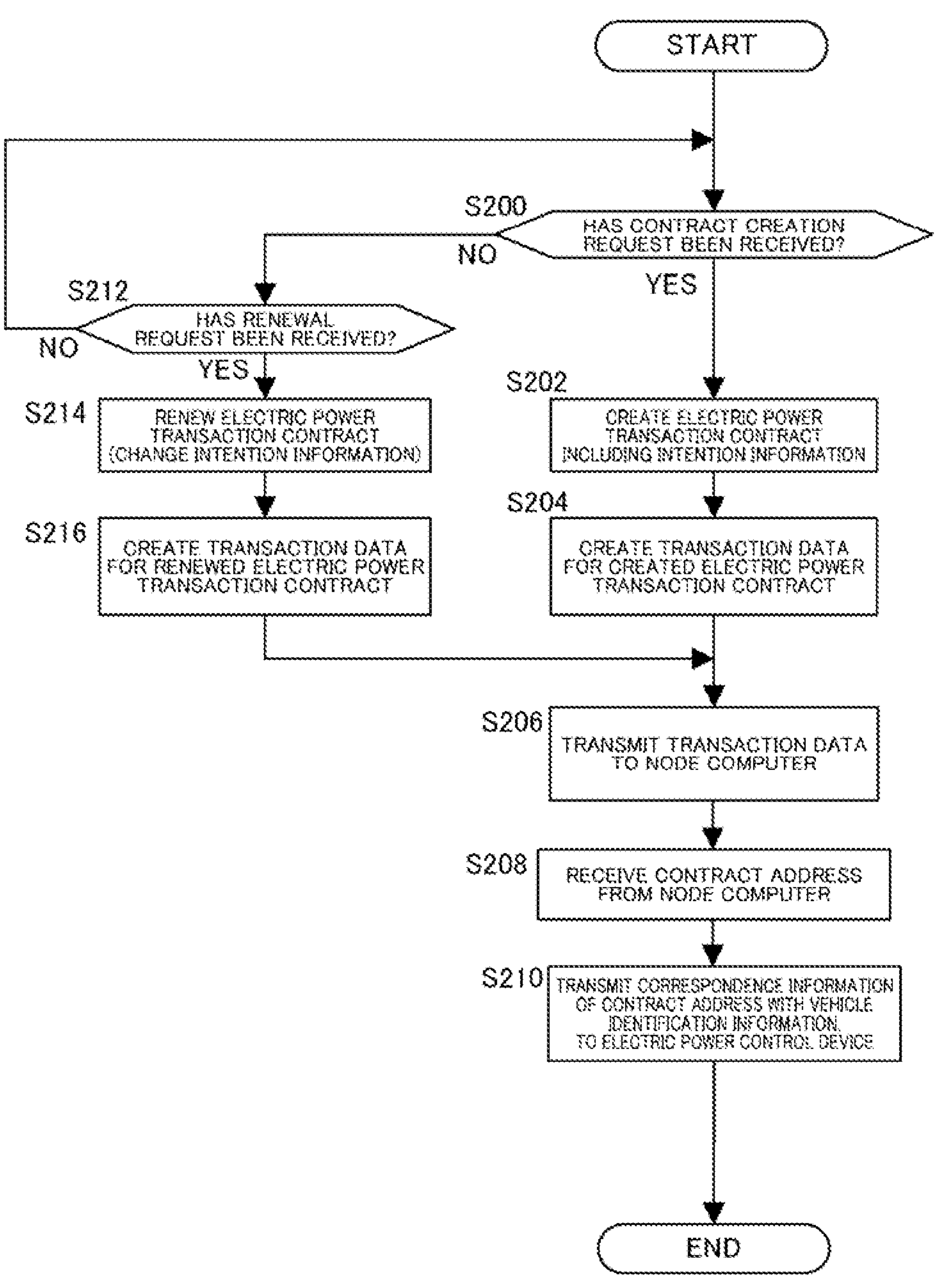
FIG. 9 is a flow chart showing a procedure of contract record processing in the electric power control system.

First, the procedure of contract record processing is to be described with reference to the flow chart shown in FIG. 9. A contract creation process is processing in which the second contractor terminal 6*b* creates or renews the electric power transaction contract in response to the request of the first contractor terminal 6*a*, and records the created or renewed electric power transaction contract in the blockchain (that is, in the distributed ledgers of node computers 3).

When the processing starts, the contract unit 41 of the second contractor terminal 6*b* first determines whether a contract creation request has been received from a first contractor terminal 6*a* of any of the users U (S200). Then, if a contract creation request has been received (S200, YES), the contract unit 41: extracts, based on the received contract creation request, the vehicle identification information of the vehicle 5 of the user U, and the intention information, which is the information on the intention of the user U regarding the charge-discharge operation of the battery 8; and creates an electric power transaction contract including the extracted vehicle identification information and intention information (S202).

Next, the generation unit 42 of the second contractor terminal 6*b* creates transaction data including the content information, which is the information on the content of the electric power transaction contract created above, and the smart contract (S204). The smart contract includes a program that transmits the content information to the terminal device having given an instruction of executing the smart contract. The generation unit 42 transmits the generated transaction data to the node computer 3*a* (S206). As a result, the block containing the transaction data is recorded in the distributed ledgers held by the respective node computers 3.

On the other hand, if the contract creation request has not been received in step 200 (S200, NO), the contract unit 41 determines whether the renewal request, which requests a change of the intention information in the already created electric power transaction contract, has been received from the first contractor terminal 6*a* (S212). Then, if the renewal request has not been received (S212, NO), the contract unit 41 returns to step S200, repeats the processing, and waits for receiving the contract creation request or the renewal request.

If the renewal request is received in step S212 (S212, YES), the contract unit 41 extracts the contract ID and the new intention information, which is the information on the new intention of the user U regarding charge-discharge operation of the battery 8, from the received renewal request. Then, the contract unit 41 renews the electric power transaction contract by changing the intention information of the electric power transaction contract, which is indicated by the contract ID, to the extracted intention information (S214).

Next, the generation unit 42 of the second contractor terminal 6*b* creates transaction data including the content information, which is the information on the content of the renewed electric power transaction contract, and the smart contract (S216). Similar to step S202, this smart contract includes a program that transmits the content information to the terminal device having given an instruction of executing the smart contract.

Then, the generation unit 42 advances processing to step S206, and transmits the generated transaction data to the node computer 3*a*. As a result, the block including the transaction data, which stores the content information of the renewed electric power transaction contract, is recorded in the distributed ledgers held by the respective node computers 3.

Next, the generation unit 42 receives the contract address, which is the storage location of the smart contract included in the transaction data, from the node computer 3*a* (S208).

Next, the information sharing unit 43 transmits the correspondence information, in which the received contract address is associated with the vehicle identification information included in the corresponding electric power transaction contract, to the electric power control device 6*c* (S210), and ends processing.

[3.2 Charge-Discharge Execution Processing]

Figure 10:
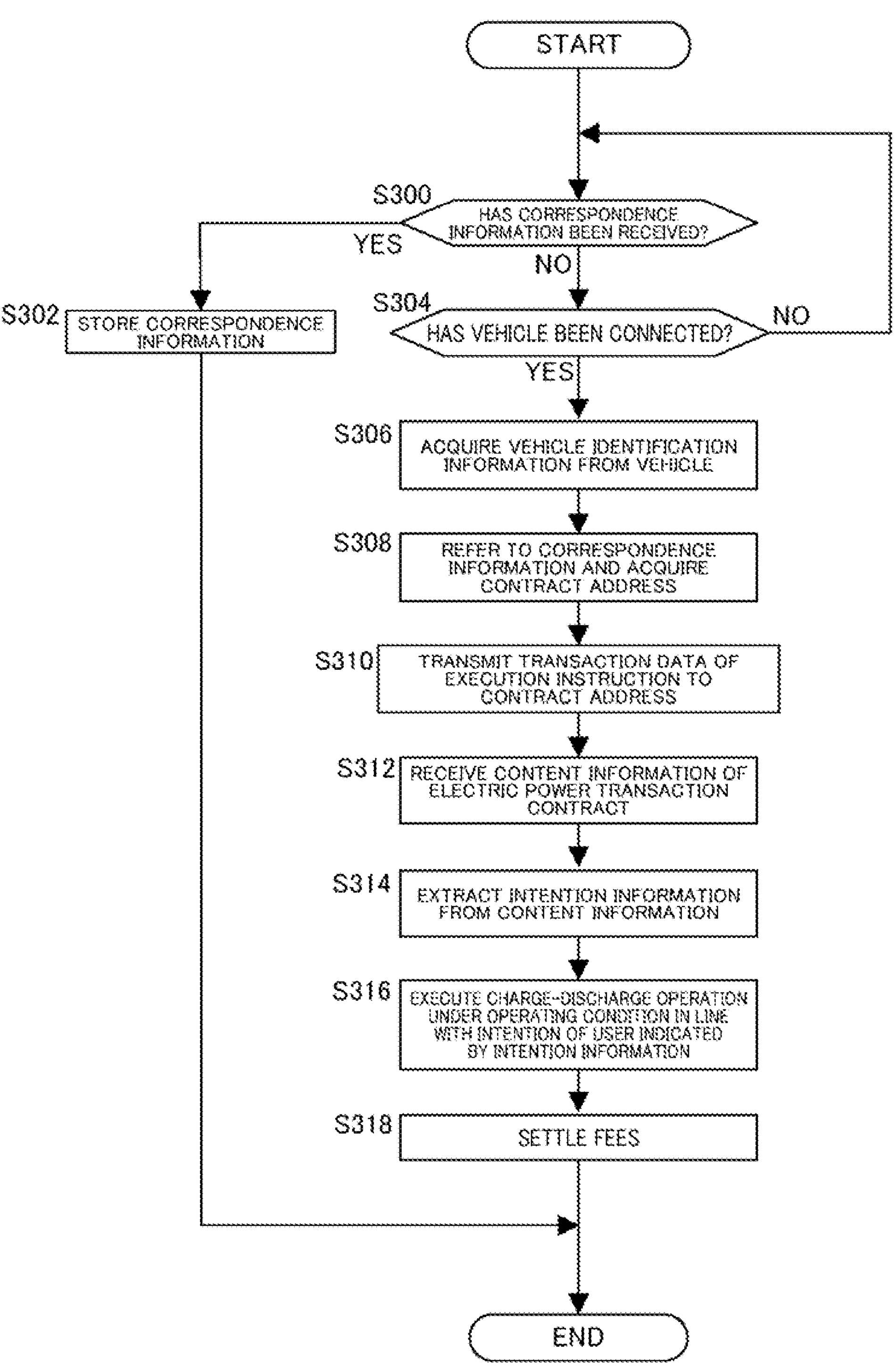
FIG. 10 is a flow chart showing a procedure of charge-discharge execution processing in the electric power control system.

The next describes a procedure of charge-discharge execution processing in the electric power control system 1 with reference to a flow chart shown in FIG. 10. The charge-discharge execution processing is processing in which the electric power control device 6*c* executes charge-discharge operation of the battery 8 with the electric power grid 7 when the battery 8 of the vehicle 5 is connected to the electric power grid 7. The processing of FIG. 10 is repeatedly executed.

When the processing starts, the information acquisition unit 61 of the electric power control device 6*c* first determines whether the correspondence information has been received from the second contractor terminal 6*b* (S300). Then, if the correspondence information has been received (S300, YES), the information acquisition unit 61 stores the received correspondence information in the correspondence information DB 66 of the memory 65 (S302), and ends this process. As described above, the correspondence information is information in which the vehicle identification information of the vehicle 5 is associated with the contract address of the smart contract that transmits the content information of the electric power transaction contract for the vehicle 5.

On the other hand, if the correspondence information has not been received in step S300 (S300, NO), the control unit 62 determines whether the battery 8 of the vehicle 5 and the electric power grid 7 are connected (S302). Then, if the battery 8 and the electric power grid 7 are not connected (S302, NO), the control unit 62 reverses processing to step S300. As a result, the electric power control device 6*c* waits for reception of the correspondence information and connection of the vehicle 5.

On the other hand, if the battery 8 of the vehicle 5 is connected to the electric power grid 7 in step S304 (S302, YES), the control unit 62 receives and acquires the vehicle identification information of the vehicle 5 transmitted by the connection detection unit 51 of the operation monitoring device 9 included in the vehicle 5 (S306). Next, the control unit 62 refers to the correspondence information stored in the correspondence information DB 66 of the memory 65 in step S302, and acquires the contract address associated with the acquired vehicle identification information (S308).

The control unit 62 generates transaction data for giving an instruction of executing the smart contract according to the prior art, and transmits the generated transaction data to the acquired contract address (S310). As a result, the smart contract is executed in the node computer 3*a*, and the content information of the electric power transaction contract, which is included in the transaction data including the smart contract, is transmitted to the electric power control device 6*c*.

Next, the control unit 62 receives the content information of the electric power transaction contract transmitted by the node computer 3*a* due to execution of the smart contract (S312), and extracts the intention information from the received content information (S314). Then, the control unit 62 executes charge-discharge operation of the battery 8 with the electric power grid 7 under the operating conditions in line with the intention of the user U indicated by the extracted intention information (S316). Subsequently, when the charge-discharge operation is completed, the settlement unit 63 of the electric power control device 6*c* settles the fees for the charge-discharge operation (S318), based on: the charge-discharge amount in the charge-discharge operation; and the electricity purchase unit price and/or electricity sales unit price included in the above content information, and ends this processing.

4. Other Embodiments

In the above-described embodiment, the vehicle identification information is the vehicle body number of the vehicle 5 or the registration number thereof displayed on the license plate, but the vehicle identification information is not limited to this. The vehicle identification number can be any information that can identify the individual vehicles 5. Such information may be a code, a figure, or the like that can be identified from the outside of the vehicle 5, like the registration number.

When the vehicle identification information can be identified from the outside of the vehicle 5 like the registration number, the control unit 62 of the electric power control device 6*c* can acquire the vehicle identification information of the vehicle 5 from, for example, an image of the vehicle 5 connected to the electric power grid 7. The image is taken by a camera that the electric power control device 6*c* may include.

The control unit 62 is provided in the electric power control device 6*c* in the above-described embodiment, but the control unit 62 is not limited to this. The control unit 62 may be provided in an in-vehicle device of the vehicle 5, for example, an operation monitoring device 9. In this case, it is possible that each of the vehicles 5 stores only the correspondence information on the vehicle 5 in the memory 55 and that the control unit 62 acquires the intention information and controls charge-discharge operation of the battery 8 based on the correspondence information.

In the above-described embodiment, when the ledger management unit 11 records the block of transaction data, received from the second contractor terminal 6*b* of the electric power company V, in the distributed ledger 21, the information providing unit 12 of the node computer 3*a* transmits the contract address, indicating the storage location of the smart contract included in the transaction data, to the second contractor terminal 6*b*, which is the transmitter. However, this is only an example, and the information providing unit 12 may transmit the contract address of the specified smart contract to the second contractor terminal 6*b* when receiving an inquiry (or transmission request) for a contract address, which specifies the above smart contract, from the second contractor terminal 6*b*. The above inquiry may be transmitted by the generation unit 42 or the information sharing unit 43 of the second contractor terminal 6*b*.

5. Configurations Supported by the Above Embodiments

The above embodiments support the following configurations.

Configuration 1

An electric power control system for controlling charge-discharge operation of a battery mounted on a vehicle, the electric power control system including: a plurality of computers, each operating so as to hold a distributed ledger identical to each other; a generation unit for generating transaction data including information related to charge-discharge operation of the battery; a ledger management unit for receiving the transaction data and for recording the received transaction data in the distributed ledger; and a control unit for controlling charge-discharge operation of the battery, wherein the information related to the charge-discharge operation includes intention information, the intention information being information on an intention of a user of the vehicle regarding the charge-discharge operation, and the control unit executes the charge-discharge operation under an operating condition, the operating condition reflecting an intention of the user based on the intention information included in the transaction data recorded in the distributed ledger.

In the electric power control system of configuration 1, in charge-discharge operation of the battery, the charge-discharge operation is executed under the operating condition according to the intention of the user, which is indicated by the intention information recorded in the distributed ledger. Therefore, the electric power control system of the configuration 1 makes it possible to perform charge-discharge operation of the battery under the operating condition accurately reflecting the intention of the user while simplifying operation of the user by eliminating the need to input the intention information in executing the charge-discharge operation.

Configuration 2

The electric power control system according to configuration 1, wherein the intention information includes an intention of the user, the intention being to prioritize prevention of deterioration of the battery or being to maintain a remaining charge amount of the battery.

The electric power control system of configuration 2 makes it possible to set the operating condition of the charge-discharge operation by using one of the two priorities in the charge-discharge operation of the battery as the intention of the user.

Configuration 3

The electric power control system according to configuration 2, wherein when an intention of the user indicated by the intention information is to prioritize prevention of deterioration of the battery, the control unit controls the charge-discharge operation so that a remaining charge amount of the battery is maintained within a predetermined range.

The electric power control system of configuration 3 makes it possible to execute the charge-discharge operation of the battery under the operating condition in line with the intention of the user who wants to prioritize prevention of battery deterioration.

Configuration 4

The electric power control system according to configuration 2, wherein when an intention of the user indicated by the intention information is to maintain a remaining charge amount of the battery, the control unit controls the charge-discharge operation so that a remaining charge amount of the battery is maintained in a range higher than a remaining charge amount at a start of the charge-discharge operation.

The electric power control system of configuration 4 makes it possible to execute the charge-discharge operation of the battery under the operating condition in line with the intention of the user who wants to prioritize maintenance of the remaining charge amount of the battery.

Configuration 5

The electric power control system according to any of configurations 1 to 4, wherein the control unit is provided in an electric power control device outside the vehicle, the electric power control device being connected to a battery of the vehicle in the charge-discharge operation.

The electric power control system of configuration 5 makes it possible to execute the charge-discharge operation of the battery under the operating condition accurately reflecting the intention of the user while simplifying the operation of the user even when the control unit is outside the vehicle.

Configuration 6

The electric power control system according to configuration 5, wherein the control unit acquires the intention information on the vehicle based on correspondence information in which vehicle identification information for identifying the vehicle is associated with access information for accessing the intention information included in the transaction data created for the vehicle.

The electric power control system of configuration 6 makes it possible to execute the charge-discharge operation of the battery under the operating condition reflecting the intention of the user of the vehicle, for each vehicle.

Configuration 7

The electric power control system according to configuration 6, wherein the transaction data includes a smart contract including a program for transmitting the intention information, and the access information is a contract address of the smart contract.

The electric power control system of configuration 7 allows the control unit to easily acquire the intention information on the vehicle, on which the charge-discharge operation is to be performed, by executing the smart contract.

Configuration 8

An electric power control method executed by an electric power control system including a vehicle and a plurality of computers, the vehicle being equipped with a battery, the plurality of computers each operating so as to hold a distributed ledger identical to each other, the electric power control method including: a step of generating, by a generation unit, transaction data including information related to charge-discharge operation of the battery; a step of receiving the transaction data and recording the received transaction data in the distributed ledger, by a ledger management unit; and a step of controlling, by a control unit, charge-discharge operation of the battery, wherein the information related to the charge-discharge operation includes intention information, the intention information being information on an intention of a user of the vehicle regarding the charge-discharge operation, and the control unit, in the step of controlling, executes the charge-discharge operation under an operating condition, the operating condition reflecting an intention of the user based on the intention information included in the transaction data recorded in the distributed ledger.

According to the electric power control method of configuration 8, in the charge-discharge operation of the battery, the charge-discharge operation is executed under the operating condition in line with the intention of the user, which is indicated by the intention information recorded in the distributed ledger. Therefore, the electric power control method of configuration 8 makes it possible to perform charge-discharge operation of the battery under the operating condition accurately reflecting the intention of the user while simplifying the operation of the user.

REFERENCE SIGNS LIST

1 . . . electric power control system, 2 . . . blockchain network, 3, 3*a*, 3*b*, 3*c*, 3*d*, 3*e* . . . node computer, 4 . . . communication network, 5, 5*a*, 5*b* . . . vehicle, 6 . . . terminal device, 6*a*, 6*a*1, 6*a*2 . . . first contractor terminal, 6*b* . . . second contractor terminal, 6*c* . . . electric power control device, 7 . . . electric power grid, 10, 30, 40, 50, 60 . . . processor, 11 . . . ledger management unit, 12 . . . information providing unit, 13 . . . contract execution unit, 20, 35, 45, 55, 65 . . . memory, 21 . . . distributed ledger, 31 . . . contract application unit, 32 . . . contract renewal unit, 36, 46, 56 . . . HID, 41 . . . contract unit, 42 . . . generation unit, 43 . . . information sharing unit, 51 . . . connection detection unit, 52 . . . operation monitoring unit, 61 . . . information acquisition unit, 62 . . . control unit, 63 . . . settlement unit, 66 . . . correspondence information DB, 71 . . . cable.

What is claimed is:

1. An electric power control system for controlling charge-discharge operation of a battery mounted on a vehicle, the electric power control system comprising:

a plurality of computers, each operating so as to hold a distributed ledger identical to each other; and a processor, wherein the processor is configured to function as:

a generation unit for generating transaction data including information related to charge-discharge operation of the battery;

a ledger management unit for receiving the transaction data and for recording the received transaction data in the distributed ledger; and a control unit for controlling charge-discharge operation of the battery, wherein the control unit is configured to detect that the battery of the vehicle is connected to an electric power grid, the information related to the charge-discharge operation includes intention information, the intention information being information on an intention of a user of the vehicle regarding the charge-discharge operation, when a contract creation request has been received from a first contractor terminal of the user, the generation unit creates the transaction data including vehicle identification information of the vehicle of the user and the intention information, the vehicle identification information and the intention information being extracted from the contract creation request, the control unit acquires and stores in memory correspondence information in which the vehicle identification information is associated with access information for accessing the intention information included in the transaction data created for the vehicle, when subsequently detecting that the battery of the vehicle is connected to the electric power grid, the control unit receives the vehicle identification information from a processor of the vehicle whose battery is connected to the electric power grid, refers to the correspondence information stored in the memory and acquires the intention information on the vehicle whose battery is connected to the electric power grid from at least one of the plurality of computers based on the access information with which the vehicle identification information acquired is associated, and the control unit executes the charge-discharge operation under an operating condition, the operating condition reflecting the intention of the user based on the intention information which is included in the transaction data recorded in the distributed ledger and which is acquired.

2. The electric power control system according to claim 1, wherein the intention of the user is to prioritize prevention of deterioration of the battery or to maintain a remaining charge amount of the battery.

3. The electric power control system according to claim 2, wherein when the intention of the user indicated by the intention information is to prioritize prevention of deterioration of the battery, the control unit controls the charge-discharge operation so that the remaining charge amount of the battery is maintained within a predetermined range.

4. The electric power control system according to claim 2, wherein when the intention of the user indicated by the intention information is to maintain the remaining charge amount of the battery, the control unit controls the charge-discharge operation so that the remaining charge amount of the battery is maintained in a range higher than a remaining charge amount at a start of the charge-discharge operation.

5. The electric power control system according to claim 1, wherein the control unit is provided in an electric power control device outside the vehicle, the electric power control device being connected to the battery of the vehicle in the charge-discharge operation.

6. The electric power control system according to claim 1, wherein the transaction data includes a smart contract including a program for transmitting the intention information, and the access information is a contract address of the smart contract.

7. An electric power control method executed by an electric power control system including a vehicle and a plurality of computers, the vehicle being equipped with a battery, the plurality of computers each operating so as to hold a distributed ledger identical to each other, the electric power control method comprising:

a step of generating, by a generation unit, transaction data including information related to charge-discharge operation of the battery;

a step of receiving the transaction data and recording the received transaction data in the distributed ledger, by a ledger management unit; and a step of controlling, by a control unit, charge-discharge operation of the battery, wherein the control unit is adapted to detect that the battery of the vehicle is connected to an electric power grid, the information related to the charge-discharge operation includes intention information, the intention information being information on an intention of a user of the vehicle regarding the charge-discharge operation, in the step of generating, when a contract creation request has been received from a first contractor terminal of the user, the generation unit creates the transaction data including vehicle identification information of the vehicle of the user and the intention information, the vehicle identification information and the intention information being extracted from the contract creation request, and in the step of controlling, the control unit acquires and stores in memory correspondence information in which the vehicle identification information is associated with access information for accessing the intention information included in the transaction data created for the vehicle, when subsequently detecting that the battery of the vehicle is connected to the electric power grid, the control unit receives the vehicle identification information from a processor of the vehicle whose battery is connected to the electric power grid, refers to the correspondence information stored in the memory and acquires the intention information on the vehicle whose battery is connected to the electric power grid from at least one of the plurality of computers based on the access information with which the vehicle identification information acquired is associated, the control unit executes the charge-discharge operation under an operating condition, the operating condition reflecting the intention of the user based on the intention information which is included in the transaction data recorded in the distributed ledger and which is acquired.

* * * * *